US011586448B2

(12) United States Patent
Lauer et al.

(10) Patent No.: US 11,586,448 B2
(45) Date of Patent: Feb. 21, 2023

(54) QUBIT RESET FROM EXCITED STATES

(71) Applicant: International Business Machines Corporation, Armonk, NY (US)

(72) Inventors: Isaac Lauer, Chappaqua, NY (US); Oliver Dial, Yorktown Heights, NY (US); Matthias Steffen, Mount Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 470 days.

(21) Appl. No.: 16/861,653

(22) Filed: Apr. 29, 2020

(65) Prior Publication Data

US 2021/0342161 A1 Nov. 4, 2021

(51) Int. Cl.
*G06F 9/4401* (2018.01)
*H04B 10/70* (2013.01)
*G06N 10/00* (2022.01)
*G06N 10/40* (2022.01)

(52) U.S. Cl.
CPC .............. *G06F 9/442* (2013.01); *G06N 10/00* (2019.01); *H04B 10/70* (2013.01); *G06N 10/40* (2022.01)

(58) Field of Classification Search
CPC ........ G06F 9/442; G06N 10/00; G06N 10/40; H04B 10/70
See application file for complete search history.

(56) References Cited

U.S. PATENT DOCUMENTS

| 8,928,391 | B2 | 1/2015 | Naaman et al. | |
| 10,235,635 | B1 | 3/2019 | Abdo | |
| 10,467,544 | B2 | 11/2019 | Filipp et al. | |
| 10,572,816 | B1* | 2/2020 | Vavilov | G06N 10/00 |
| 2019/0294991 | A1* | 9/2019 | Filipp | H03K 3/38 |
| 2021/0357797 | A1* | 11/2021 | Karalekas | G06N 10/00 |
| 2021/0390442 | A1* | 12/2021 | Niu | G06N 10/00 |

OTHER PUBLICATIONS

Magnard, et al. "Fast and Unconditional All-Microwave Reset of a Superconducting Qubit." Phys. Rev. Lett. 121, 060502 (2018), Phys. Rev. Lett. 121, 060502 (2018). 9 pages.
Konen, et al. "Qubit Measurement by Multichannel Driving." arXiv:1810.05465v2 [quant-ph] Feb. 25, 2019. 15 pages.
(Continued)

*Primary Examiner* — Terrell S Johnson
(74) *Attorney, Agent, or Firm* — Amin, Turocy & Watson, LLP

(57) ABSTRACT

Techniques regarding resetting highly excited qubits are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a reset component that can de-excite a qubit system to a target state by transitioning a population of a first excited state of the qubit system to a ground state and by applying a signal to the qubit system that transitions a population of a second excited state to the first excited state.

20 Claims, 12 Drawing Sheets

(56) References Cited

OTHER PUBLICATIONS

Egger, et al. "Pulsed reset protocol for fixed-frequency superconducting qubits" arXiv:1802.08980v2 [quant-ph] Apr. 1, 2019. 7 pages.
Geerlings, et al. "Demonstrating a Driven Reset Protocol for a Superconducting Qubit" Physical Review Letters, 2013. 5 pages.
"Active Reset of Superconducting Qubits." Zurich Instruments. Jul. 2017. 4 pages.
Mell, Peter, et al. "The NIST Definition of Cloud Computing." National Institute of Standards and Technology. Sep. 2011. 7 pages.

\* cited by examiner

QUBIT RESET FROM EXCITED STATES

BACKGROUND

The subject disclosure relates to resetting qubits from excited states, and more specifically, to conditionally or unconditionally resetting qubits from excited states that can include states higher than a first excited energy level.

Quantum computers can encode information in one or more quantum bits ("qubits") via quantized excitations of a degree of freedom in superconducting devices. Qubits are prepared in a known state of excitation before circuits can be applied to them. Also, in some architectures qubits can be recycled throughout a quantum computation. A process by which qubits are initialized to a known state with high fidelity can be referred to as a "reset" of the qubits.

Qubits can be reset to the known state, for example a ground state, via passive or active preparation. For instance, a qubit reset can be passively achieved by waiting a sufficient amount of time after the last circuit of the quantum computer has run in order for the energy relaxation to return the qubit from its excited state to the target state (e.g., a ground state). To maintain high fidelity, it is traditionally necessary to consider various decay time constants; thereby limiting the throughput of the quantum computer. In another instance, a qubit reset can be actively achieved applying one or more signals to de-excite the qubit. Further, an active reset can be conditional, wherein the state of the qubit is initially interrogated, or unconditional, wherein the reset is initiated without interrogating the current state of the qubit.

A narrow range of qubit excited states is generally desired for quantum computations (e.g., a ground state and a first energy state). However, there is a finite probability that during operation qubits can unintentionally transition to higher excited states (e.g., a second energy state, a third energy state, etc.); thereby causing an error on the circuit. If the qubit does not return to the ground state before the next circuit is started, the next circuit will then be affected by the error from the previous circuit rather than the desired result of being independent. Additionally, some circuits can intentionally transition the qubit to a higher level state, which will need to be returned to the ground state before the next circuit can be run. Traditional reset procedures are unable to efficiently and/or effectively reset a qubit regardless of the qubit's excited state; particularly when the qubit is being reset from one or more higher excited states. Further, some operations, such as the measurement of transmons, can excite the qubit to the higher excited states.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can reset a qubit from one or more high excited states are described According to an embodiment, a system is provided. The system can comprise a memory that stores computer executable components. The system can also comprise a processor, operably coupled to the memory, and that can execute the computer executable components stored in the memory. The computer executable components can comprise a reset component that can de-excites a qubit system to a target state by transitioning a population of a first excited state of the qubit system to a ground state, and by applying a signal to the qubit system that transitions a population of a second excited state to the first excited state. An advantage of such a system can be the unconditional reset of highly excited qubits.

In some examples, the system can comprise a transition component that can generate the signal that transitions the population of the second excited state to the first excited state. The signal can comprise at least one transition signal selected from the group consisting of a pi pulse transition signal and a microwave chirp transmission signal. An advantage of such a system can be the active and rapid transitioning of qubit states.

According to an embodiment, a computer-implemented method is provided. The computer-implemented method can comprise transitioning, by a system operatively coupled to a processor, a population of a first excited state of a qubit system to a ground state. The computer-implemented method can also comprise applying, by the system, a signal to the qubit system that transitions a population of a second excited state to the first excited state. An advantage of such a computer-implemented method can be the reset of highly excited qubits without requiring a tunable low frequency resonator.

In some examples, the transitioning the population of the first excited state to the ground state is performed via a reset selected from the group consisting of a measurement based reset, a sideband based reset, a low-Q reset, and a pi pulse reset. An advantage of such a computer-implemented method can be the enablement of rapid qubit resets between executing circuits of a quantum computer 108.

According to an embodiment, a computer program product for de-exciting a qubit system is provided. The computer program product can comprise a computer readable storage medium having program instructions embodied therewith. The program instructions can be executable by a processor to cause the processor to transition, by the processor, a population of a first excited state of the qubit system to a ground state. Also, the program instructions can cause the processor to apply, by the processor, a signal to the qubit system that transitions a population of a second excited state to the first excited state. An advantage of such a computer program product can be the operation of quantum computers with low error rates, even if the quantum circuit experiences energy leaks into highly excited qubit states.

In some examples, the program instructions can further cause the processor to transition the population of the first excited state to the ground state via a low-Q reset, and render, by the processor, a low-Q resonator of the qubit system to degenerate with the second excited state. An advantage of such a computer program product can be the unconditional reset of highly excited state qubits with minimal time between quantum circuit runs.

DETAILED DESCRIPTION

Figure 1:
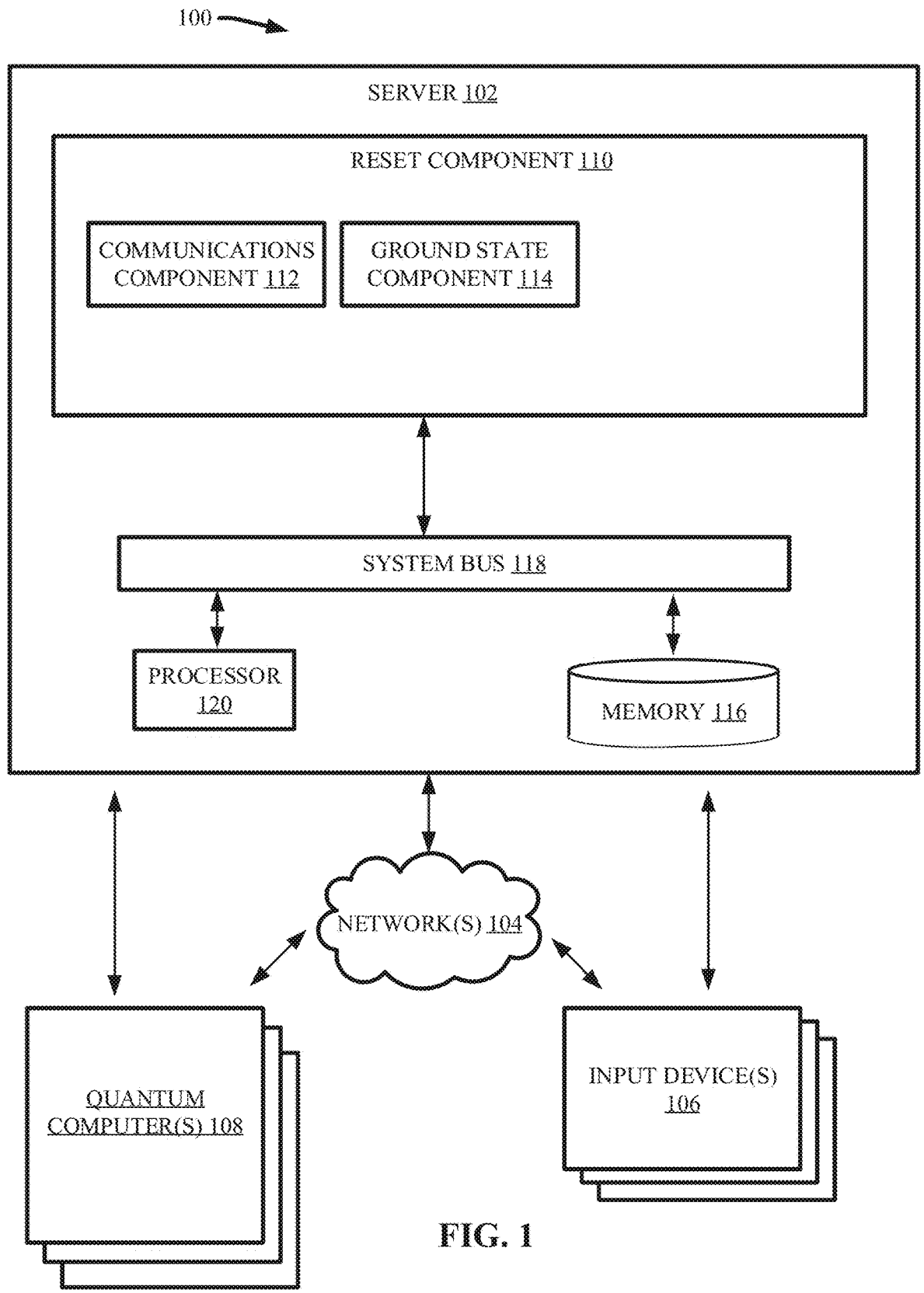
FIG. 1 illustrates a block diagram of an example, non-limiting system that can facilitate one or more conditional and/or unconditional qubit resets in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with other implementations of qubit resets; the present disclosure can be implemented to produce a solution to one or more of these problems by enabling a qubit reset regardless of a qubit's excited state. Advantageously, one or more embodiments described herein can be performed unconditionally. Further, various embodiments described herein can enable higher throughput on quantum computing systems while minimizing a negative impact on qubit fidelity. In addition, one or more embodiments described herein can be performed without the necessity of flux-tunable elements; thereby, enabling use without modification to the quantum computer hardware.

Various embodiments of the present invention can be directed to computer processing systems, computer-implemented methods, apparatus and/or computer program products that facilitate the efficient, effective, and autonomous (e.g., without direct human guidance) conditional and/or unconditional qubit resets from highly excited energy states. For example, one or more embodiments described herein can regard a non-unitary operation to remove entropy from one or more qubits followed by a unitary operation that can remove a photon from one or more remaining excited qubits. For instance, one or more qubit resets described herein can implement a microwave chirp signal to sweep across of variety of qubit excited state frequencies to promote de-excitation. Additionally, one or more qubit resets described herein can include a series of pi-pulse signals that can transition a population of excited qubits between excitation states to promote de-excitation.

The computer processing systems, computer-implemented methods, apparatus and/or computer program products employ hardware and/or software to solve problems that are highly technical in nature (e.g., condition or unconditional qubit resets), that are not abstract and cannot be performed as a set of mental acts by a human. For example, an individual, or a plurality of individuals, cannot analyze qubit states and/or derive signal frequencies with the efficiency needed to reset qubits between execution of quantum computer circuits.

Also, one or more embodiments described herein can constitute a technical improvement over conventional qubit reset procedures by enabling an active qubit reset from high excitation states, such as energy states greater than a second energy state (e.g., with reference to a ground state). Additionally, various embodiments described herein can demonstrate a technical improvement over conventional qubit reset procedures by actively de-exciting highly excited qubits unconditionally without requiring the quantum computer to comprise custom flux-tunable elements. For example, various embodiments described herein can implement a microwave chirp and/or a series of pi-pulse signals to remove photons from one or more qubits, and thereby perform an unconditional qubit reset.

Further, one or more embodiments described herein can have a practical application by actively implementing a qubit reset of highly excited qubits between circuit executions and/or circuit initializations. For instance, various embodiments described herein can be implemented for quantum computer error correction and/or to increase repetition rate in one or more quantum computers. One or more embodiments described herein can actively control the excited state of one or more qubits conditionally or unconditionally. Thereby, the one or more embodiments, can de-excite qubits with minimal time between circuit executions with a low error rate even if the qubits have leaked, intentionally or unintentionally, to highly excited states.

As described herein, the term "highly excited state" or "highly excited states" can refer to a qubit excitation state that has a greater energy level than a first excitation state with reference to a ground excitation state, which can be a qubit state having a minimal amount of energy. For example, the energy level of a qubit can be elevated from the ground state via excitation to a plurality of possible excitation states. From the plurality of possible excitation states, the excitation state having the lowest energy level can be the first excitation state. From the remaining plurality of possible excitation states, the excitation state having the second to lowest energy level can be the second excitation state, wherein the pattern can continue to define a third excitation state, a fourth excitation state, etc. Thereby, higher excitation states are association with higher energy levels. Excitation states greater than the first excitation state (e.g., second excitation state, third excitation state, etc.) can be referred to as highly excited states. As described herein, quantum computers can generally run using qubits in the ground state or first excitation state; however, qubits can occasionally be excited to highly excited states during operation of the quantum computer (e.g., intentionally or unintentionally).

As described herein, the term "reset signal" can refer to one or more microwave signals generated by one or more microwave drives at a frequency that transitions a qubit population of a first excitation state to a ground state. In various embodiments, the reset signal can be implemented via a sideband reset, a measurement based reset, and/or a low-Q reset. For example, a sideband reset can include one or more microwave sideband reset techniques that deterministically drive one or more qubits from a first energy state (e.g., first excitation state) to a second energy state (e.g., the ground state) without impacting other energy states (e.g., highly excited states). In another example, a measurement based reset can include one or more techniques that measure if a qubit is in a first energy state (e.g., first excitation state) and then applies a π-pulse to bring the qubit to a second energy state (e.g., the ground state) if needed. In a further example, one or more qubits can be coupled to a transmission line resonator having a low quality factor and being degenerate with a defined state (e.g., first excitation state) such that one or more coupled qubits in the defined state (e.g., first excitation state) de-excite via a rapid decay to a lower state (e.g., ground state).

FIG. 1 illustrates a block diagram of an example, non-limiting system 100 that can facilitate condition or unconditional qubit resets. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, input devices 106, and/or quantum computers 108. The server 102 can comprise reset component 110. The reset component 110 can further comprise communications component 112 and/or ground state component 114. Also, the server 102 can comprise or otherwise be associated with at least one memory 116. The server 102 can further comprise a system bus 118 that can couple to various components such as, but not limited to, the reset component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or quantum computers 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the reset component 110 can be provided on the one or more servers 102, it should be appreciated that the architecture of system 100 is not so limited. For example, the reset component 110, or one or more components of reset component 110, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to command, augment, and/or modify one or more functions performed by the reset component 110 into the system 100. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

In various embodiments, the one or more quantum computers 108 can comprise quantum hardware devices that can utilize the laws of quantum mechanics (e.g., such as superposition and/or quantum entanglement) to facilitate computational processing (e.g., while satisfying the DiVincenzo criteria). In one or more embodiments, the one or more quantum computers 108 can comprise a quantum data plane, a control processor plane, a control and measurement plane, and/or a qubit technology.

In one or more embodiments, the quantum data plane can include one or more quantum circuits comprising physical qubits, structures to secure the positioning of the qubits, and/or support circuitry. The support circuitry can, for example, facilitate measurement of the qubits' state and/or perform gate operations on the qubits (e.g., for a gate-based system). In some embodiments, the support circuitry can comprise a wiring network that can enable multiple qubits to interact with each other. Further, the wiring network can facilitate the transmission of control signals via a direct electrical connection and/or electromagnetic radiation (e.g., optical, microwave, and/or low-frequency signals). For instance, the support circuitry can comprise one or more superconducting resonators operatively coupled to the one or more qubits. As described herein the term "superconducting" can characterize a material that exhibits superconducting properties at or below a superconducting critical temperature, such as aluminum (e.g., superconducting critical temperature of 1.2 Kelvin) or niobium (e.g., superconducting critical temperature of 9.3 Kelvin). Additionally, one of ordinary skill in the art will recognize that other superconductor materials (e.g., hydride superconductors, such as lithium/magnesium hydride alloys) can be used in the various embodiments described herein.

In one or more embodiments, the control processor plane can identify and/or trigger a Hamiltonian sequence of quantum gate operations and/or measurements, wherein the sequence executes a program (e.g., provided by a host processor, such as server 102) for implementing a quantum algorithm. For example, the control processor plane can convert compiled code to commands for the control and measurement plane. In one or more embodiments, the control processor plane can further execute one or more quantum error correction algorithms.

In one or more embodiments, the control and measurement plane can convert digital signals generated by the control processor plane, which can delineate quantum operations to be performed, into analog control signals to perform the operations on the one or more qubits in the quantum data plane. Also, the control and measurement plane can convert one or more analog measurement outputs of the qubits in the data plane to classical binary data that can be shared with other components of the system 100 (e.g., such as the reset component 110, via, for example, the control processor plane). In one or more embodiments, the control and measurement plane can comprise one or more microwave drives that can generate microwave signals (e.g., microwave chirps and/or π-pulses) at various defined frequencies or frequency ranges.

One of ordinary skill in the art will recognize that a variety of qubit technologies can provide the basis for the one or more qubits of the one or more quantum computers 108. Two exemplary qubit technologies can include trapped ion qubits and/or superconducting qubits. For instance, wherein the quantum computer 108 utilizes trapped ion qubits, the quantum data plane can comprise a plurality of ions serving as qubits and one or more traps that serve to hold the ions in specific locations. Further, the control and measurement plane can include: a laser or microwave source directed at one or more of the ions to affect the ion's quantum state, a laser to cool and/or enable measurement of the ions, and/or one or more photon detectors to measure the state of the ions. In another instance, superconducting qubits (e.g., such as superconducting quantum interference devices "SQUIDs") can be lithographically defined electronic circuits that can be cooled to milli-Kelvin temperatures to exhibit quantized energy levels (e.g., due to quantized states of electronic charge or magnetic flux). Superconducting qubits can be Josephson junction-based, such as transmon qubits and/or the like. Also, superconducting qubits can be compatible with microwave control electronics, and can be utilized with gate-based technology or integrated cryogenic controls. Additional exemplary qubit technologies can include, but are not limited to: photonic qubits, quantum dot qubits, gate-based neutral atom qubits, semiconductor qubits (e.g., optically gated or electrically gated), topological qubits, a combination thereof, and/or the like. In various embodiments, the one or more quantum computers 108 can include fixed-frequency superconducting qubits, which can undergo one or more reset procedures executed via the reset component 110.

In one or more embodiments, the communications component 112 can facilitate the sharing of data between the reset component 110 and the one or more quantum computers 108, and/or vice versa (e.g., via a direct electrical connection and/or through the one or more networks 104). Additionally, the communications component 112 can facilitate the sharing of data between the reset component 110 and the one or more input devices 106, and/or vice versa (e.g., via a direct electrical connection and/or through the one or more networks 104).

In various embodiments, the ground state component 114 can command the one or more quantum computer 108 to generate one or more reset signals to transition a population of qubits from the first excitation state to the ground state. For example, the one or more reset signals can be implemented via sideband based reset, a measurement based reset, and/or a low-Q reset. In one or more embodiments, the one or more quantum computers 108 can generate the one or more reset signals via one or more microwave drives. Wherein the reset signal is implemented via one or more measurement based resets, the energy level of the qubits comprised within the one or more quantum computers 108 can be measured via readout circuitry also comprised within the one or more quantum computers 108 (e.g., comprised within with the control and measurement plane). For example, the readout circuitry can share the measured excitation state of the qubits with the ground state component 114 (e.g., via the communications component 112 and/or network 104), whereupon the ground state component 114 can identify qubits in the first excitation state for de-excitation by the reset signal.

In one or more embodiments, the ground state component 114 can execute one or more reset signals via the one or more quantum computers 108 to prepare the quantum computers 108 for one or more quantum computations. For instance, the ground state component 114 can execute the one or more reset signals prior to one or more quantum computations performed by the one or more quantum computers 108. In another instance, the ground state component 114 can execute the one or more reset signals between quantum computations. Also, in various embodiments, the ground state component 114 can execute the one or more reset signals unconditionally (e.g., without ascertaining current energy state of the qubits).

Figure 2:
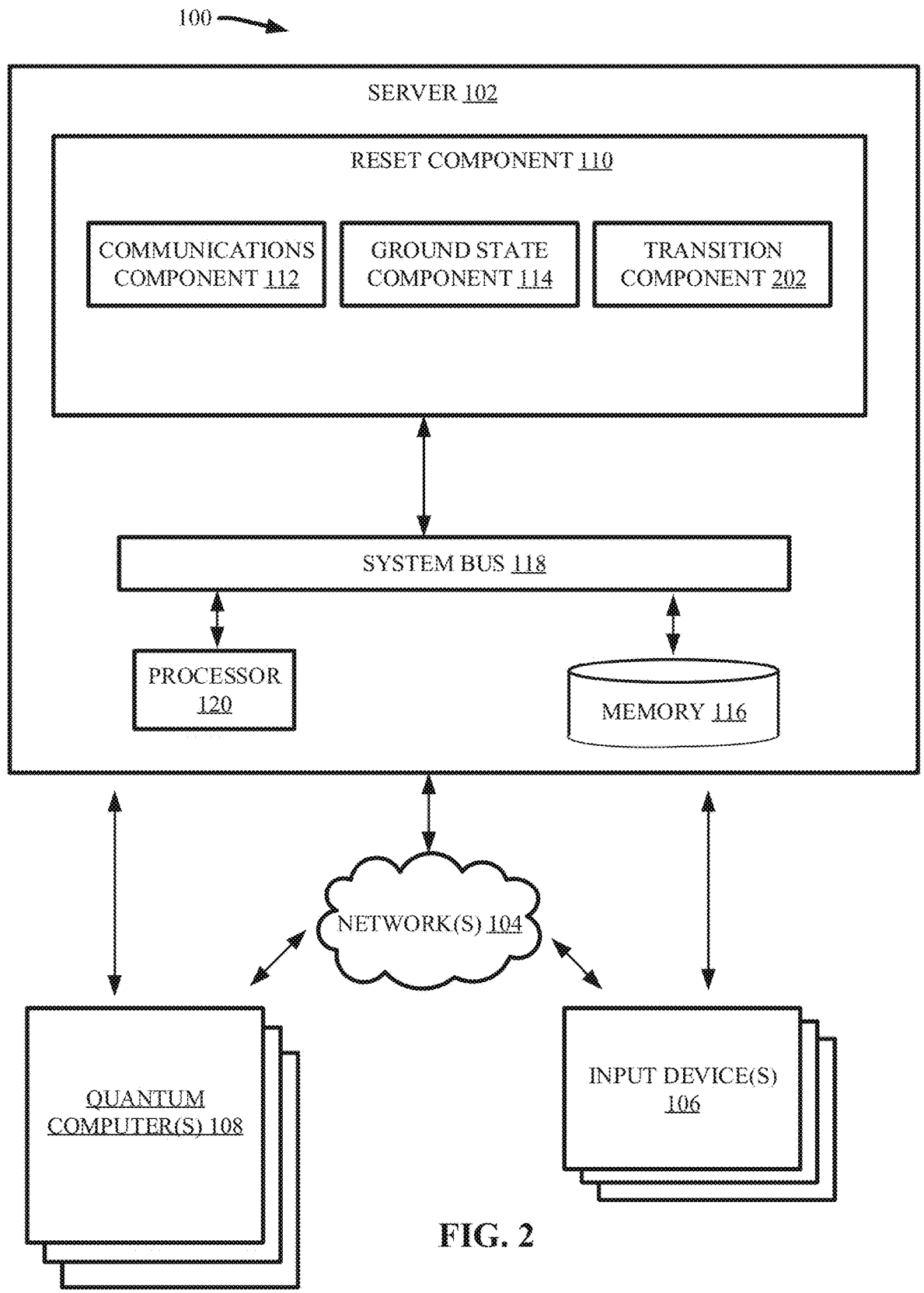
FIG. 2 illustrates a block diagram of an example, non-limiting system that can facilitate one or more conditional and/or unconditional qubit resets in accordance with one or more embodiments described herein.

FIG. 2 illustrates a diagram of the example, non-limiting system 100 further comprising transition component 202 in accordance with one or more embodiments described herein. Repetitive description of like elements employed in other embodiments described herein is omitted for sake of brevity. In various embodiments, the transition component 202 can execute one or more transition signals to transition qubit populations from one energy state to another. For instance, the one or more transition signals can remove a photon from one or more excited qubits to drive de-excitement.

In one or more embodiments, the one or more transition signals can be one or more microwave π-pulses that can be generated by one or more microwave drivers of the one or more quantum computers 108. For example, the one or more transition signals can comprise a π-pulse or a series of π-pulses driven at frequency that facilitates a transition between two defined qubit energy states. For example, the one or more π-pulse transition signals can transition a qubit population at first energy state (e.g., a first excitation state) with a qubit population at a second energy state (e.g., a second excitation state) and vise versa. Thereby, the one or more π-pulse transition signals can exchange qubit populations between target energy states. The energy states subjected to the exchange can be targeted by adjusting the frequency of the one or more π-pulse transition signals. In various embodiments, the transition component 202 can set the frequency of the one or more π-pulse transition signals, and thereby delineate the qubit energy states targeted for transition.

In one or more embodiments, the one or more transition signals can be one or more microwave chirps that can be generated by one or more microwave drivers of the one or more quantum computers 108. For example, the one or more transition signals can comprise a microwave chirp that sweeps across a range of frequencies. As the chirp transition signal sweeps the frequency range, the chirp transition signal can successively exchange qubit populations between energy states associated with the various frequencies within the frequency range. For instance, as the chirp transition signal is at a first frequency of the frequency range, the chirp transition signal can drive an exchange of a qubit population between a first energy state and a second energy state. As the chirp transition signal progresses to a second frequency of the frequency range, the chirp transition signal can drive an exchange of a qubit population between the second energy state and a third energy state. As the chirp transition signal further progresses to a third frequency of the frequency range, the chirp transition signal can further drive an exchange of a qubit population between the third energy state and a fourth energy state. The chirp transition signal can continue to drive energy state exchanges as the chirp transition signal progresses through the frequency range. Thereby, the chirp transition signal drive a series of energy state exchanges across a target range of energy states associated with the frequency range of the chirp transition signal. In various embodiments, the transition component 202 can set the frequency range of the one or more chirp transition signals, and thereby delineate the qubit energy states targeted for sequential exchange.

In one or more embodiments, the one or more input devices 106 can be employed to enter, populate, and/or modify one or more frequency reference databases into the system 100. In various embodiments, the one or more frequency reference databases can be stored in the one or more memories 116. The one or more frequency reference databases can delineate respective frequencies and qubit excitation state exchanges known to be associated with the respective frequencies for the one or more quantum computers 108. For example, the one or more frequency reference databases can indicate the microwave frequency associated with one or more possible qubit excitation state exchanges for the one or more quantum computers 108. For instance, the one or more frequency reference database can include a first frequency value associated with a qubit exchange transition between the first and second excitation states. In another instance, the one or more frequency reference database can include a second frequency value associated with a qubit exchange transition between the second and third excitation states. One of ordinary skill in the art will recognize that the number of frequency values included in the one or more frequency reference databases can depend on the number of possible excitation state exchanges for the one or more quantum computers 108. Further, the frequency values can vary depending on the hardware characteristics of the quantum computers 108, wherein respective frequency reference tables can be associated with respective quantum computers 108.

The reset component 110 (e.g., including the transition component 202) can analyze the one or more frequency reference databases to set the frequencies for the one or more reset signals and/or π-pulse transition signals. For example, wherein the transition component 202 is coordinating an excitation state exchange between the first excitation state and the second excitation state, the transition component 202 can set the π-pulse transition signal to be executed by the one or more quantum computers 108 at a frequency associated with the first and second excitation state exchange within the one or more frequency reference databases. Further, the reset component 110 (e.g., including the transition component 202) can analyze the one or more frequency reference databases to set the frequency range for the one or more chirp transition signals. For example, wherein the transition component 202 is coordinating a chirp transition signal to drive a sequence of excitation state exchanges, the transition component 202 can set the chirp transition signal to be executed by the one or more quantum computers 108 across a frequency range associated with the lowest and highest excitation states of the qubit array. Additionally, in one or more embodiments, the one or more input devices 106 can be employed to set a default highest excitation state associated with the quantum computer 108 being reset so as to facilitate unconditional performance. For example, wherein the default highest excitation state is set to the fourth excitation state, the reset component 110 can assume that at least one qubit of the one or more quantum computers 108 populates the fourth excitation state and accordingly determine the number of reset signal and/or transition signal repetitions to be implemented to transition the fourth excitation state qubit to the ground state.

In various embodiments, the transition component 202 can coordinate one or more series of π-pulse transition signals to transition qubits of highly excited states to the first excitation state, whereupon the ground state component 114 can initiate one or more reset signals to de-excite the qubits into the ground state. For example, the ground state component 114 can first execute (e.g., via the one or more quantum computers 108) a reset signal that transitions qubits from the first excitation state to the ground state; thereby rendering a population of first excitation state qubits equal to zero. Next, the transition component 202 can coordinate the series of π-pulse transition signals to successively de-excite the remaining excited qubits. For instance, a first π-pulse transition signal of the series can be generated at a frequency that exchanges qubits between the first excitation state and the second excitation state. Since there are no qubits in the first excitation state (e.g., at least due to the reset signal), the exchange results in transitioning the second excitation state qubits to the first excitation state and rendering a population of second excitation state qubits equal to zero. Further, a second π-pulse transition signal of the series can be generated at a frequency that exchanges qubits between the second excitation state and the third excitation state. Since there are no qubits in the second excitation state (e.g., at least due to the first π-pulse transition signal), the exchange results in transitioning the third excitation state qubits to the second excitation state and rendering a population of third excitation state qubits equal to zero. The series of π-pulse transition signals can comprise any plurality of π-pulse transition signals, and thereby de-excite a corresponding plurality of qubits in highly excited states.

Figure 3:
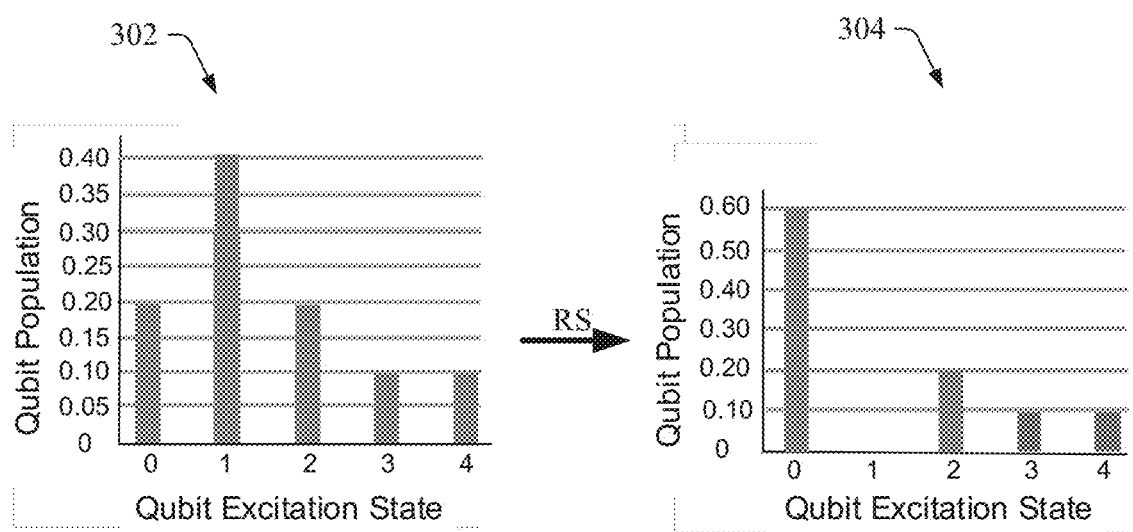
FIG. 3 illustrates a diagram of example, non-limiting bar graphs that can depict qubit populations in various excited states during a first stage of a qubit reset in accordance with one or more embodiments described herein.

Subsequent to the transition component 202 implementing the series of π-pulse transition signals, the ground component 114 can implement a second reset signal. The second reset signal can again render the population of qubits in the first excitation state equal to zero, and thereby prepare the array of qubits for subjection to another series of π-pulse transition signals. The reset component 110 can repeatedly implement reset signals and series of π-pulse transition signals until all the qubits of the one or more quantum computers 108 are in the ground state. Further, reset component 110 can implement the reset signals and/or π-pulse transition signals unconditionally; thereby, enabling an active and unconditional reset of qubits from highly excited states. FIGS. 3-4C can exemplify the reset process described above with regards to reset signals implemented by the ground state component 114 and/or π-pulse transition signals implemented by the transition component 202.

In one or more embodiments, the reset component 110 can implement the π-pulse transition signals and reset signals in one or more alternate orders. For example, to reset a qubit from the third excitation state, the reset component 110 can implement the described transition and/or reset signals in accordance with Sequence 1 or Sequence 2 below.

$$RS \rightarrow Xp12 \rightarrow Xp23 \rightarrow RS \rightarrow Xp12 \rightarrow RS \quad (1)$$

$$RS \rightarrow Xp12 \rightarrow RS \rightarrow Xp23 \rightarrow Xp12 \rightarrow RS \quad (2)$$

Wherein "RS" represents one or more reset signals, "Xp12" represents one or more π-pulse transition signals having a frequency that can drive an exchange between the first and second excitation states, and "Xp23" represents one or more π-pulse transition signals having a frequency that can drive an exchange between the second and third excitation states. Further, one of ordinary skill in the art will recognize that the features of Sequence 1 or 2 can be extrapolated to regard other excitation states (e.g., greater than the third excitation state) in accordance with the various embodiments described herein. For example, to reset a qubit from the fourth excitation state, the reset component 110 can implement the described transition and/or reset signals in accordance with Sequence 3 or Sequence 4 below.

$$RS \rightarrow Xp12 \rightarrow Xp23 \rightarrow Xp34 \rightarrow RS \rightarrow Xp12 \rightarrow Xp23 \rightarrow RS \rightarrow Xp12 \rightarrow RS \quad (3)$$

$$RS \rightarrow Xp12 \rightarrow RS \rightarrow Xp23 \rightarrow Xp12 \rightarrow RS \rightarrow Xp34 \rightarrow Xp23 \rightarrow Xp12 \rightarrow RS \quad (4)$$

Wherein "Xp34" represents one or more π-pulse transition signals having a frequency that can drive an exchange between the third and fourth excitation states.

In various embodiments, the transition component 202 can implement one or more microwave chirp transition signals (e.g., via the one or more quantum computers 108) to transition qubits of highly excited states to the first excitation state, whereupon the ground state component 114 can initiate one or more reset signals to de-excite the qubits into the ground state. For example, the ground state component 114 can first execute (e.g., via the one or more quantum computers 108) a reset signal that transitions qubits from the first excitation state to the ground state; thereby rendering a population of first excitation state qubits equal to zero. Next, the transition component 202 can implement a chirp transition signal that de-excites the remaining excited qubits to one energy state lower than their current energy state. For instance, the chirp transition signal can drive a sequence of energy state exchanges as the chirp transition signal progresses through the target frequency range. As described above with regards to the series of π-pulses, since the first excitation state is empty at the time the chirp transition signal is implemented the sequential exchanges result in de-exciting the excited qubits by one energy level (e.g., from the second excitation state to the first excitation state, from the third excitation state to the second excitation state, etc.).

Figure 5:
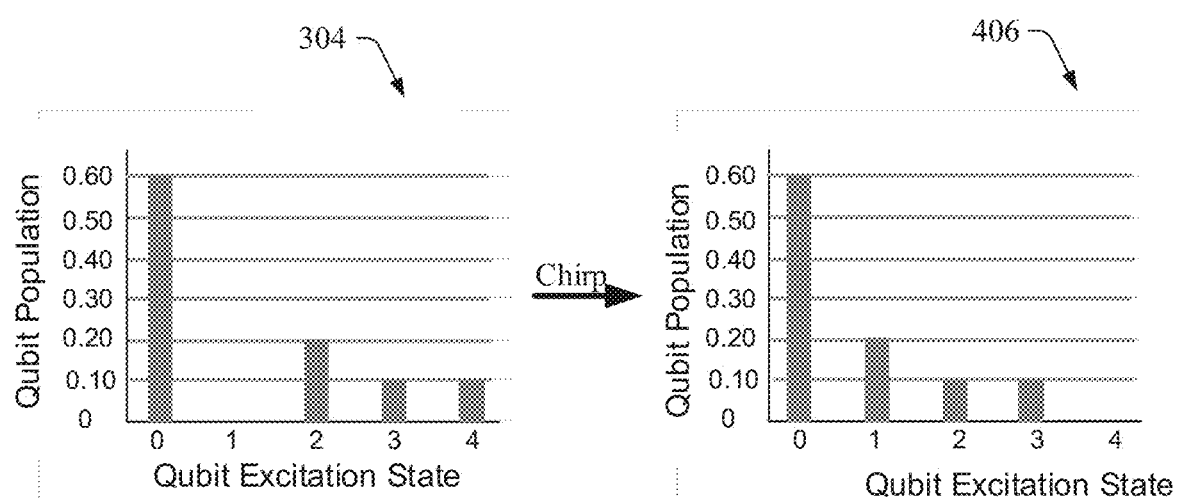
FIG. 5 illustrates a diagram of example, non-limiting bar graphs that can depict the qubit population in various excited states during a microwave signal chirp of a qubit reset in accordance with one or more embodiments described herein.

Subsequent to the transition component 202 implementing the chirp transition signal, the ground component 114 can implement a second reset signal. The second reset signal can again render the population of qubits in the first excitation state equal to zero, and thereby prepare the array of qubits for subjection to another chirp transition signal. The reset component 110 can repeatedly implement reset signals and chirp transition signals until all the qubits of the one or more quantum computers 108 are in the ground state. Further, reset component 110 can implement the reset signals and/or chirp transition signals unconditionally; thereby, enabling an active and unconditional reset of qubits from highly excited states. FIGS. 3 and 5 can exemplify the reset process described above with regards to reset signals implemented by the ground state component 114 and/or chirp transition signals implemented by the transition component 202.

Figure 6:
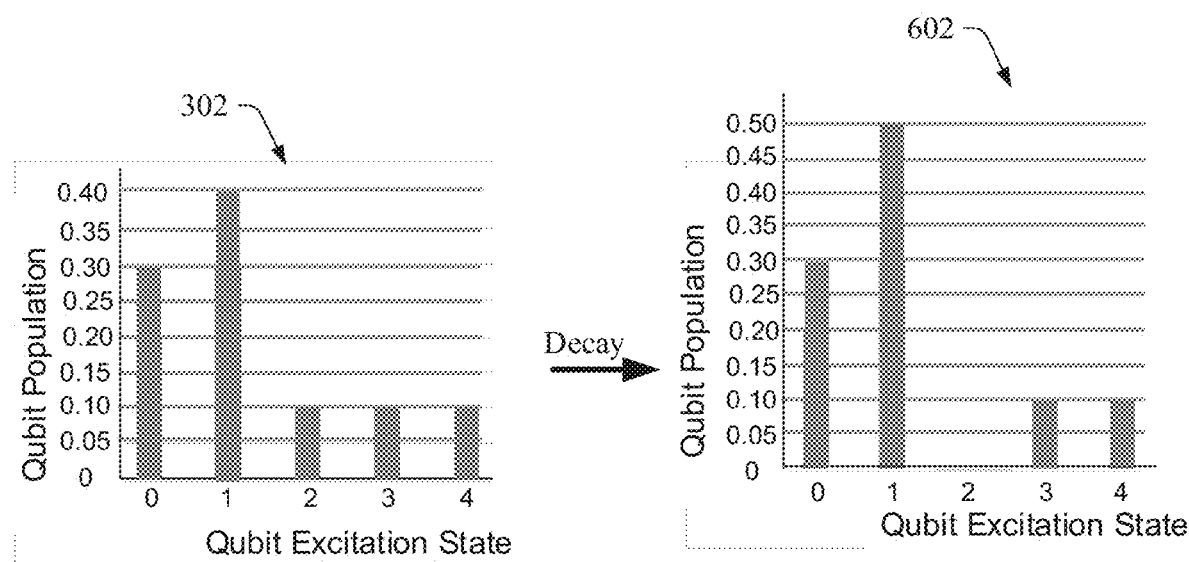
FIG. 6 illustrates a diagram of example, non-limiting bar graphs that can depict qubit populations in various excited states during a first stage of a low-Q qubit reset in accordance with one or more embodiments described herein.
Figure 7:
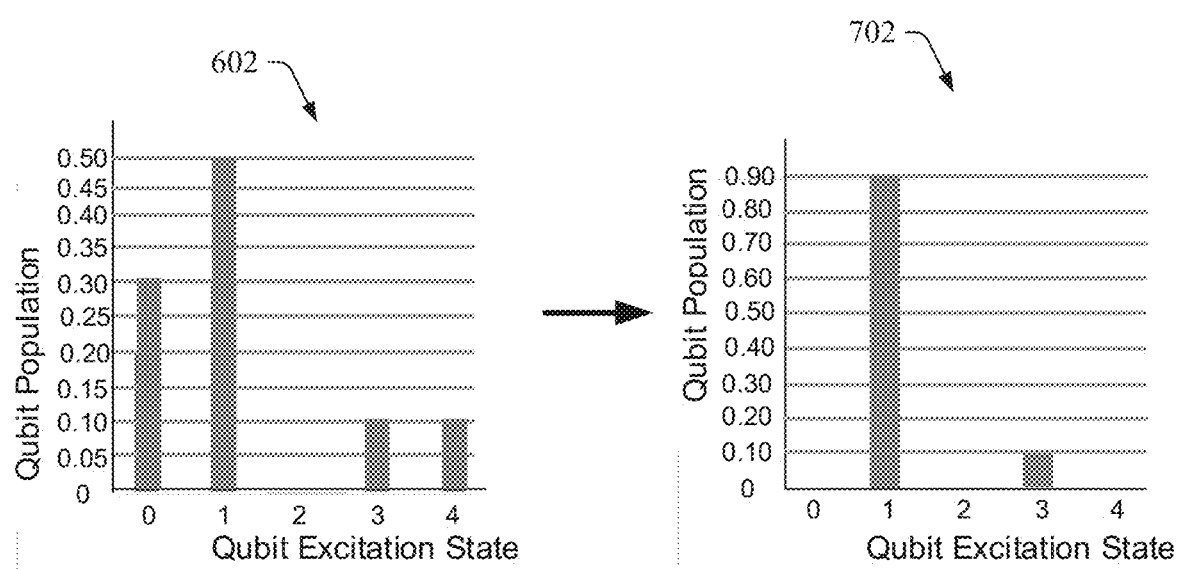
FIG. 7 illustrates a diagram of example, non-limiting bar graphs that can depict the qubit population in various excited states during a microwave signal chirp of a qubit reset in accordance with one or more embodiments described herein.

In various embodiments, the transition component 202 can implement one or more π-pulse and/or microwave chirp transition signals (e.g., via the one or more quantum computers 108) to transition qubits to a target energy state, wherein the one or more qubits can be coupled to one or more superconducting resonators having a low quality factor. Upon transitioning to the target energy state, the qubits can de-excite via decay to facilitate a reset. The reset component 110 can repeatedly implement π-pulse and/or chirp transition signals until all the qubits of the one or more quantum computers 108 are transitioned to the low-Q decaying target energy state. Further, reset component 110 can implement the one or more π-pulse and/or chirp transition signals unconditionally; thereby, enabling an active and unconditional reset of qubits from highly excited states. FIGS. 6-7 can exemplify the reset process described above with regards to one or more π-pulse and/or chirp transition signals implemented by the transition component 202 in conjunction with a low-Q resonator (e.g., comprised within the one or more quantum computers 108).

Coupling the one or more qubits to one or more superconducting resonators having a low quality factor can facilitate a reset of the one or more qubits to the ground state or a desired excitation state. For example, in one or more embodiments the reset component 110 can reset the one or more qubits to a desired excitation state from anywhere in the qubit manifold. For instance, the low-Q resonator can be degenerate with a target excitation state that is one excitation state higher than the desired excitation state, wherein repeated implementation of π-pulse transition signals or chirp transition signals can coordinate transition of the qubits to the desired excitation state. The one or more chirp transition signals and/or π-pulse transition signals can add a photon to qubits in states below the target excitation state and remove a photon from qubits above the target excitation state. Thereby, the reset component 110 can transition the qubits into the target excitation state through repeatedly implementation of the one or more transition signals. Subsequently, the reset component 110 can transition the qubits from their degenerative state to the desired excitation state through one or more further implementations of the transition signals. Further, resetting the qubits to the desired excitation state can be performed by the reset component 110 unconditionally.

For example, wherein the desired excitation state is the first excitation state and the qubit array comprises one or more qubits in at least the third excitation state, the low-Q resonator can be degenerate with respect to the second excitation state. The transition component 202 can apply one or more chirp transition signals or π-pulse transition signals to transition any qubits in the first excitation state to the second excitation state, whereupon the qubits can decay back rapidly. Further, the transition component 202 can apply one or more chirp transition signals or π-pulse transition signals to transition the third excitation state qubits to the second excitation state, whereupon the qubits can decay quickly. Repeated implementation of the chirp and/or π-pulse transition signals can return all the qubits of the qubit array to the first excitation state.

FIG. 3 illustrates a diagram of example, non-limiting graphs that can exemplify the effects of one or more reset signals implemented by the ground state component 114 in accordance with one or more embodiments described herein. Repetitive description of like elements employed in other embodiments described herein is omitted for sake of brevity. As shown in FIG. 3, graphs 302 and/or 304 can depict the qubit population associated with a variety of excitation states for an exemplary qubit array of the one or more quantum computers. For instance, the exemplary qubit array comprises qubits in the ground state (e.g., excitation state 0), the first excitation state (e.g., excitation state 1), the second excitation state (e.g., a highly excited state 2), the third excitation state (e.g., a highly excited state 3), and the fourth excitation state (e.g., a highly excited state 4).

In various embodiments, the ground state component 114 can implement one or more reset signals (e.g., via the one or more quantum computers 108) by a sideband reset and/or a measurement based reset. As shown in graph 304, the one or more reset signals (e.g., indicated by "RS" in FIG. 3) can transition the qubit population initially in the first excitation state to the ground state. Further, the one or more reset signals can leave the qubit populations of the highly excited states unaffected. The ground state component 114 can implement the one or more reset signals to achieve a de-excitation exemplified by FIG. 3 to initialize one or more qubit resets in accordance with one or more embodiments described herein.

Figure 4A:
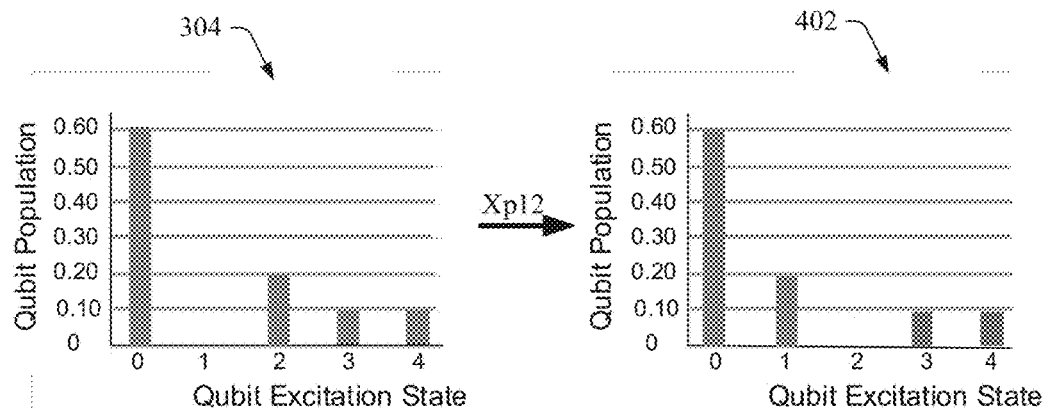
FIGS. 4A-4C illustrate a diagram of example, non-limiting bar graphs that can depict qubit populations in various excited states during a series of pi-pulse de-excitations of qubit reset in accordance with one or more embodiments described herein.
Figure 4B:
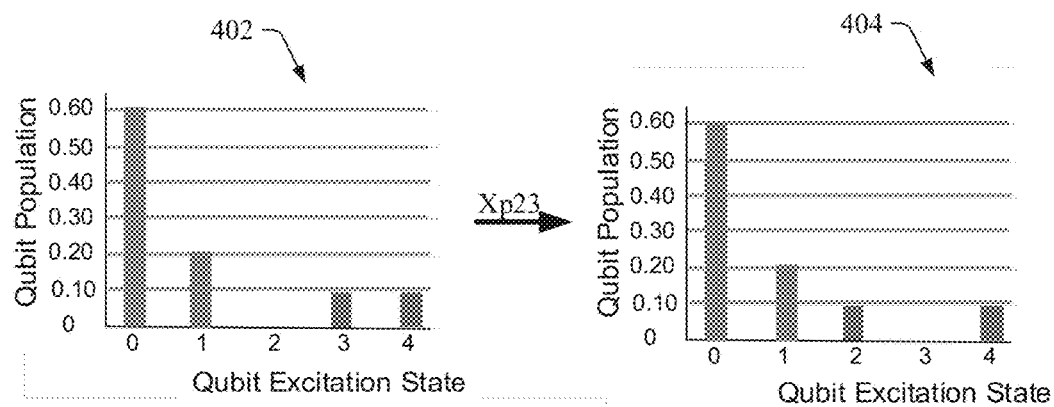
Figure 4C:
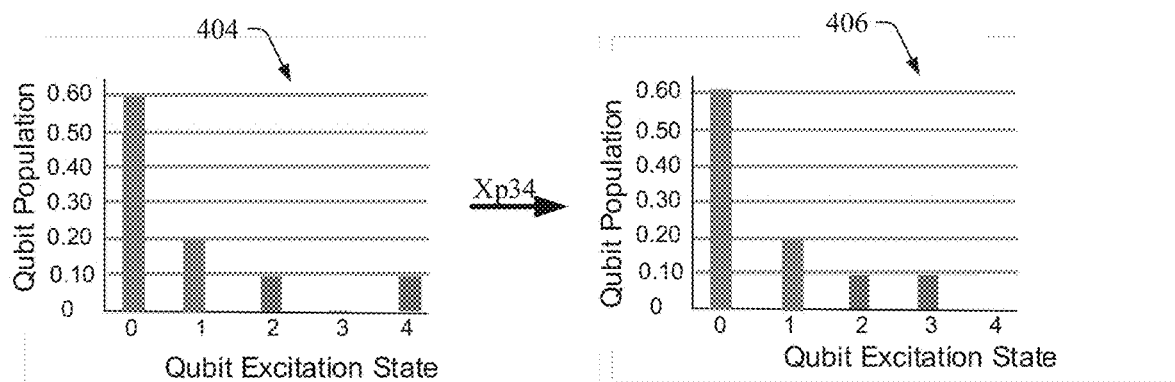

FIGS. 4A-4C illustrate diagrams of example, non-limiting graphs that can exemplify the effects of one or more π-pulse transition signals implemented by the transition component 202 in accordance with one or more embodiments described herein. Repetitive description of like elements employed in other embodiments described herein is omitted for sake of brevity. FIG. 4A exemplifies the effect that can be achieved via the implementation of one or more π-pulse transition signals by the transition component 202. As shown in FIG. 4A, the transition component 202 can implement (e.g., via the one or more quantum computers 108) one or more first π-pulse transition signals (e.g., indicated by "Xp12" in FIG. 4A) of a series of π-pulse transition signals to exchange qubit populations of the exemplary qubit array between the first excitation state and the second excitation state. Since, one or more previously implemented reset signals have emptied the qubit population in the first excitation state (e.g., as shown in graph 304), the first π-pulse transition signal can effectively de-excite qubits from the second excitation state to the first excitation state (e.g., as shown in graph 402).

As shown in FIG. 4B, the transition component 202 can further implement (e.g., via the one or more quantum computers 108) one or more second π-pulse transition signals (e.g., indicated by "Xp23" in FIG. 4B) of a series of π-pulse transition signals to exchange qubit populations of the exemplary qubit array between the second excitation state and the third excitation state. For example, the one or more second π-pulse transition signals (e.g., indicated by "Xp23" in FIG. 4B) can have a different frequency than the one or more first π-pulse transition signals (e.g., indicated by "Xp12" in FIG. 4A). Since, the one or more first π-pulse transition signals have emptied the qubit population in the second excitation state (e.g., as shown in graph 402), the second π-pulse transition signal can effectively de-excite qubits from the third excitation state to the second excitation state (e.g., as shown in graph 404).

As shown in FIG. 4C, the transition component 202 can further implement (e.g., via the one or more quantum computers 108) one or more third π-pulse transition signals (e.g., indicated by "Xp34" in FIG. 4C) of a series of π-pulse transition signals to exchange qubit populations of the exemplary qubit array between the third excitation state and the fourth excitation state. For example, the one or more third π-pulse transition signals (e.g., indicated by "Xp34" in FIG. 4C) can have a different frequency than the one or more second π-pulse transition signals (e.g., indicated by "Xp23" in FIG. 4B). Since, the one or more second π-pulse transition signals have emptied the qubit population in the third excitation state (e.g., as shown in graph 404), the third π-pulse transition signal can effectively de-excite qubits from the fourth excitation state to the third excitation state (e.g., as shown in graph 406).

Thereby, FIGS. 4A-4C can depict a series of π-pulse transition signals comprising three π-pulse transition signals that can be implemented by the transition component 202. As a result of the series of π-pulse transition signals, all of the excited qubits can be de-excited by one excitation state and the qubit population of the fourth excitation state can be rendered zero. In accordance with the various embodiments described herein, the ground state component 114 can subsequently implement a second reset signal to de-excite the qubits of the first excitation state, and the transition component 202 can implement a second series of π-pulse transition signals (e.g., comprising two π-pulse transition signals) to de-excite the remaining highly excited state qubits. The reset component 110 can repeat the implementations of the reset signals and/or 7C-pulse transition signals exemplified in FIGS. 3-4C until all the qubits of the exemplary qubit array are de-excited to the ground state. One of ordinary skill in the art will recognize that the number of repetitions performed by the reset component 110 can be based on the highest excitation state experienced by the qubit array.

FIG. 5 illustrates a diagram of example, non-limiting graphs that can exemplify the effects of one or more chirp transition signals implemented by the transition component 202 in accordance with one or more embodiments described herein. Repetitive description of like elements employed in other embodiments described herein is omitted for sake of brevity. FIG. 5 exemplifies the effect that can be achieved via the implementation of one or more chirp transition signals by the transition component 202. As shown in FIG. 5, the one or more chirp transition signals can sequentially exchange qubits between increasingly higher excitation states so as to de-excite the excited qubits by one excitation state and de-populate the qubit population of the exemplary qubit array's highest excitation state (e.g., de-populating the fourth excitation state for the example qubit array associated with FIG. 5).

FIG. 6 illustrates a diagram of example, non-limiting graphs that can exemplify the effects of using one or more low-Q resonators to de-excite one or more target excitation states in accordance with one or more embodiments described herein. Repetitive description of like elements employed in other embodiments described herein is omitted for sake of brevity. As shown in FIG. 6, the example qubit array can be coupled to one or more low-Q resonators that can degenerate with, for example, the second excitation state. Graph 602 exemplifies that qubits entering the second excitation state can rapidly decay (e.g., to the first excitation state).

FIG. 7 illustrates a diagram of example, non-limiting graphs that can exemplify the effects of using one or more low-Q resonators to de-excite one or more target excitation states in accordance with one or more embodiments described herein. Repetitive description of like elements employed in other embodiments described herein is omitted for sake of brevity. As shown in FIG. 7, one or more transition signals (e.g., chirps and/or π-pulses) can be implemented to add a photon to the excitation states that are below the excitation state degenerative with the low-Q resonator (e.g., the second excitation state) and remove a photon from the excitation states that are above the excitation state degenerative with the low-Q resonator.

As shown in FIG. 7, the transition component 202 can implement one or more chirp transition signals or series of π-pulse transition signals to drive a sequence of excitation state exchanges. Among the sequence of excitation state exchanges, qubits of the first excitation state can transition to the second excitation state, and qubits of the ground state can transition to the first excitation state. Further, the qubits that have transitioned to the second excitation state from the first excitation state can then decay to the first excitation state due to the low-Q resonator (e.g., as shown in FIG. 6). Thereupon, the sequence of excitation state exchanges can continue such that the qubits of the third excitation state can transition to the second excitation state, and the qubits of the fourth excitation state can transition to the third excitation state. Moreover, the qubits that have transitioned to the second excitation state from the third excitation state can then decay to the first excitation state due to the low-Q resonator (e.g., as shown in FIG. 6).

In various embodiments, the transition component 202 can repeatedly implement transition signals (e.g., chirp transition signals and/or π-pulse transition signals) to further transition highly excited state qubits to the second excitation state for decay (e.g., with regards to the exemplary qubit array characterized by FIG. 7, transitioning the qubits remaining in the third excitation state to the second excitation state). Once the qubits have de-excited due to rapid decay driven by the low-Q resonator, the reset procedure can terminate (e.g., if the degenerative state is the desired excitation state of the qubits), or the reset procedure can continue in accordance with various embodiments described herein to de-excite the qubits to the ground state (e.g., wherein the degenerative state is the first excitation state, as shown in FIGS. 6-7, one or more reset signals can be implemented to return the qubits to the ground state).

Figure 8:
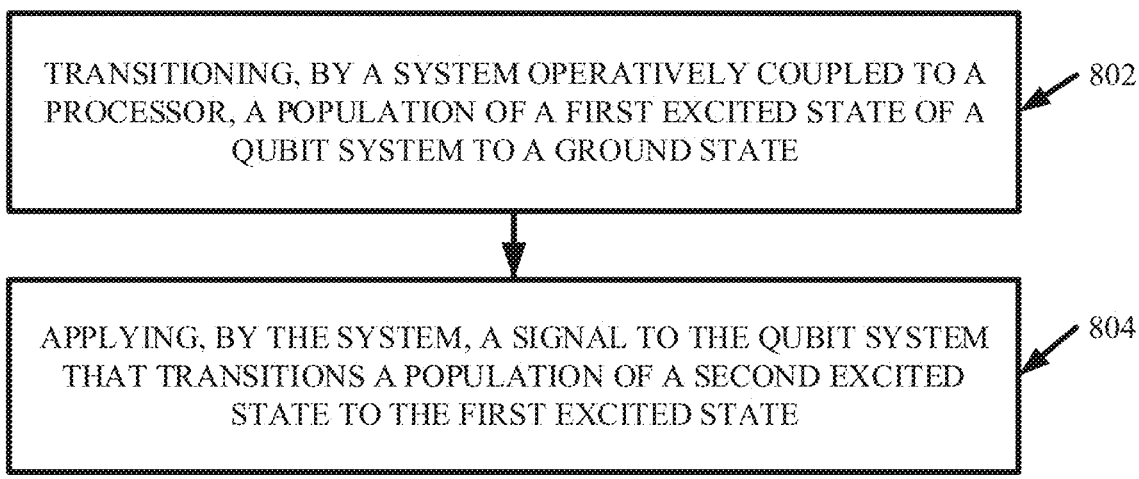
FIG. 8 illustrates a flow diagram of an example, non-limiting computer-implemented method that can facilitate resetting one or more qubits in accordance with one or more embodiments described herein.

FIG. 8 illustrates a flow diagram of an example, non-limiting computer-implemented method 800 that can facilitate one or more unconditional qubit resets in accordance with one or more embodiments described herein. Repetitive description of like elements employed in other embodiments described herein is omitted for sake of brevity.

At 802, the computer-implemented method 800 can comprise transitioning (e.g., via ground state component 114), by a system 100 operatively coupled to a processor 120, a population of a first excited state of a qubit system to a ground state. For example, the transitioning at 802 can comprise implementing one or more reset signals via one or more quantum computers 108 in accordance with various embodiments described herein. For instance, the transitioning at 802 can implement one or more reset signals (e.g., via a sideband reset, measurement based reset, and/or coupling with a low-Q resonator) to transition one or more qubits of one or more quantum computers 108 from a first excitation state to a ground state.

At 804, the computer-implemented method 800 can comprise applying (e.g., via transition component 202), by the system 100, one or more signals to the qubit system that transitions a population of a second excited state to the first excited state. For example, the signals applied at 804 can be one or more transition signals (e.g., microwave chirps and/or π-pulses) in accordance with various embodiments described herein. For instance, the signals at 804 can de-excite the population of the second excited state (e.g., one or more highly excited states, such as a second excitation state) to the first excited state (e.g., first excitation state). As described herein, the one or more transition signals (e.g., microwave chirps and/or π-pulses) can drive a sequence of excitation state exchanges, and/or can be repeatedly applied until all of the highly excited states are de-populated.

Figure 9:
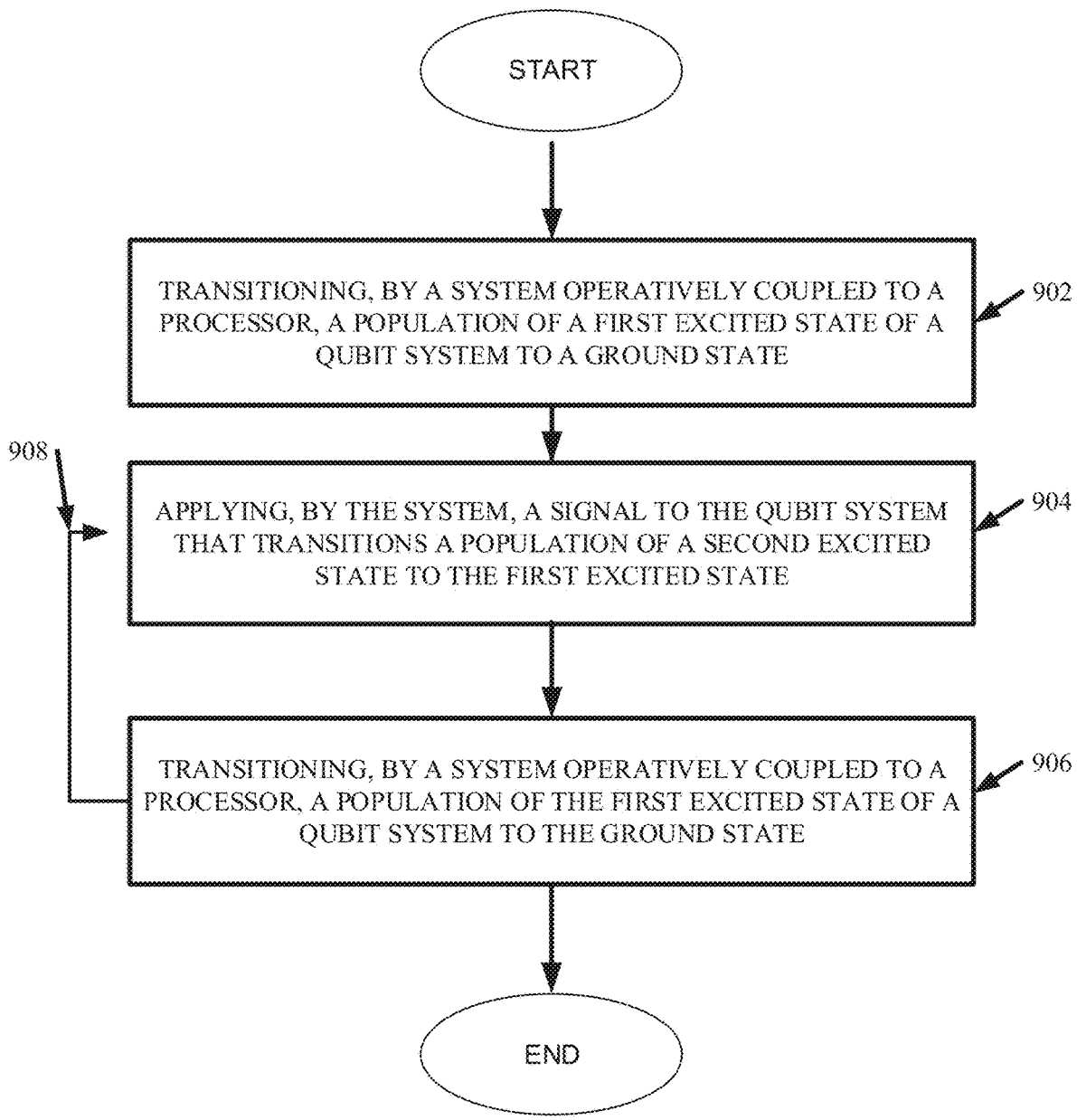
FIG. 9 illustrates a flow diagram of an example, non-limiting computer-implemented method that can facilitate resetting one or more qubits in accordance with one or more embodiments described herein.

FIG. 9 illustrates a flow diagram of an example, non-limiting computer-implemented method 900 that can facilitate one or more unconditional qubit resets in accordance with one or more embodiments described herein. Repetitive description of like elements employed in other embodiments described herein is omitted for sake of brevity.

At 902, the computer-implemented method 800 can comprise transitioning (e.g., via ground state component 114), by a system 100 operatively coupled to a processor 120, a population of a first excited state of a qubit system to a ground state. For example, the transitioning at 902 can comprise implementing one or more reset signals via one or more quantum computers 108 in accordance with various embodiments described herein. For instance, the transitioning at 902 can implement one or more reset signals (e.g., via a sideband reset, measurement based reset, and/or coupling with a low-Q resonator) to transition one or more qubits of one or more quantum computers 108 from a first excitation state to a ground state.

At 904, the computer-implemented method 900 can comprise applying (e.g., via transition component 202), by the system 100, one or more signals to the qubit system that transitions a population of a second excited state to the first excited state. For example, the signals applied at 804 can be one or more transition signals (e.g., microwave chirps and/or π-pulses) in accordance with various embodiments described herein. For instance, the signals at 804 can de-excite the population of the second excited state (e.g., one or more highly excited states, such as a second excitation state) to the first excited state (e.g., first excitation state). As described herein, the one or more transition signals (e.g., microwave chirps and/or π-pulses) can drive a sequence of excitation state exchanges.

At 906, the computer-implemented method 900 can comprise transitioning (e.g., via ground state component 114), by a system 100 operatively coupled to a processor 120, the population of a first excited state of a qubit system to the ground state. For example, the transitioning at 906 can comprise implementing one or more second reset signals via one or more quantum computers 108 in accordance with various embodiments described herein. As indicated at 908, the computer-implemented method 900 can repeat steps 904 and 906 to de-excite highly excited state qubits to the first excitation state and implement one or more reset signals. In various embodiment, the computer-implemented method 900 can repeat steps 904 and 906 at 908 a defined number of times (e.g., one or more input devices 106 can be employed to define the number of repetitions). Predefining the number of repetitions can facilitate unconditional execution of the computer-implemented method 900 (e.g., without requiring a measurement assessment of state of the qubits).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
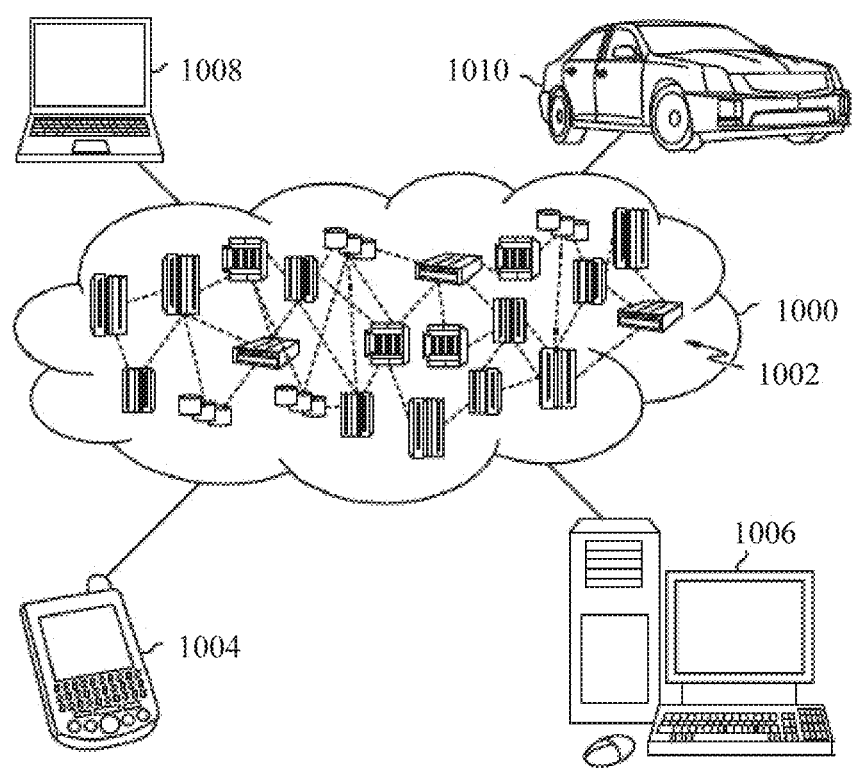
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
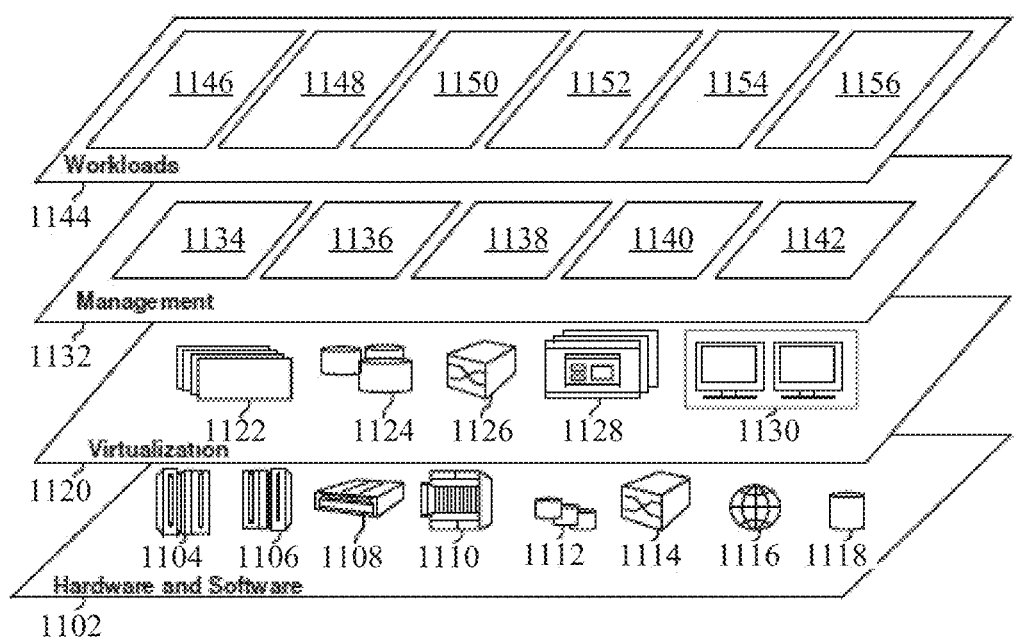
FIG. 11 depicts abstraction model layers in accordance with one or more embodiments described herein

Referring now to FIG. 11, a set of functional abstraction layers provided by cloud computing environment 1000 (FIG. 10) is shown. Repetitive description of like elements employed in other embodiments described herein is omitted for sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and qubit reset processing 1156. Various embodiments of the present invention can utilize the cloud computing environment described with reference to FIGS. 10 and 11 to perform one or more conditional or unconditional resets of highly excited state qubits in one or more quantum computers 108.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
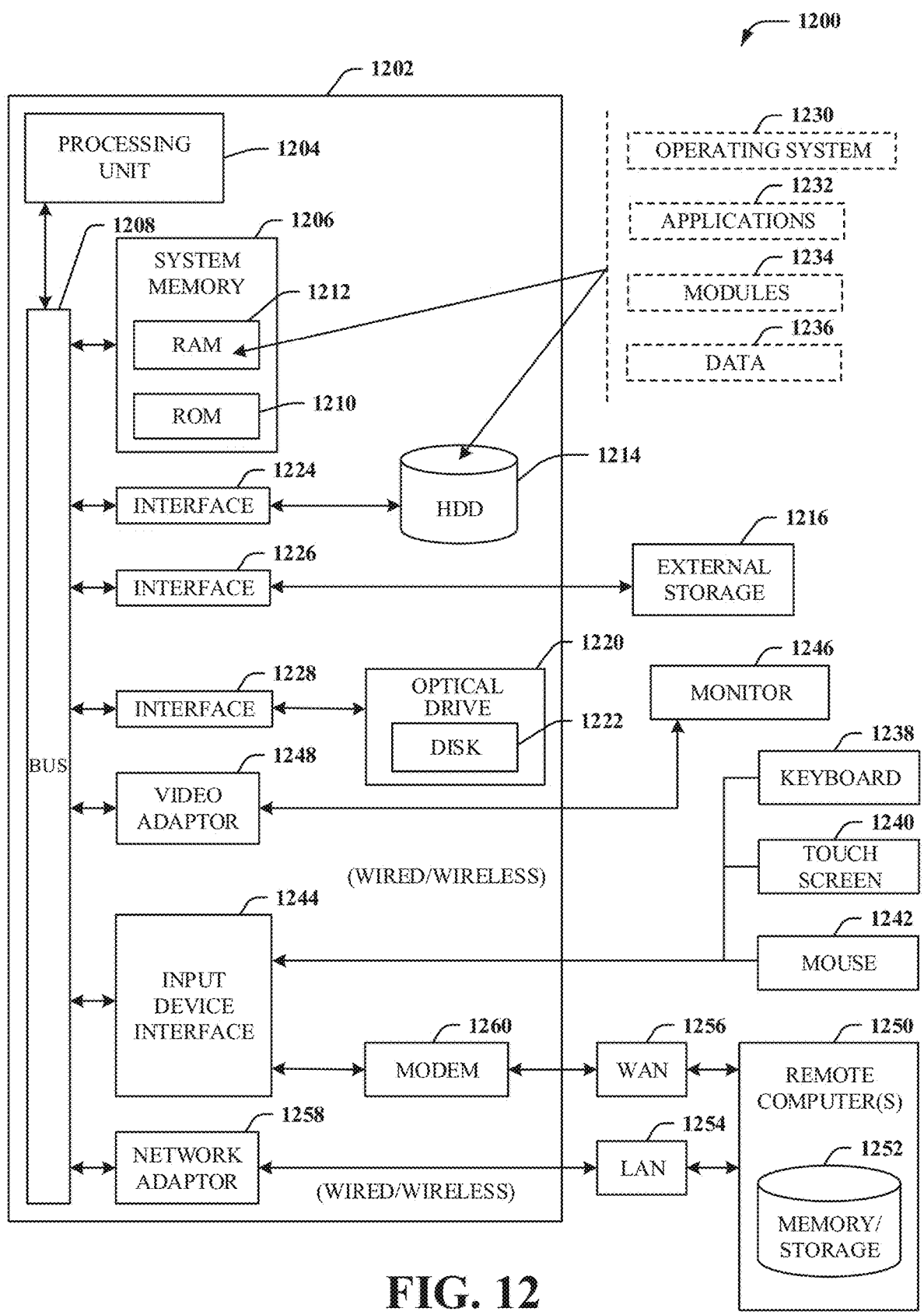
FIG. 12 illustrates a block diagram of an example, non-limiting operating environment in which one or more embodiments described herein can be facilitated.

In order to provide additional context for various embodiments described herein, FIG. 12 and the following discussion are intended to provide a general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system ("BIOS") can be stored in a non-volatile memory such as ROM, erasable programmable read only memory ("EPROM"), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive ("HDD") 1214 (e.g., EIDE, SATA), one or more external storage devices 1216 (e.g., a magnetic floppy disk drive ("FDD") 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive ("SSD") could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine ("VM") of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1202, e.g., applied at the application execution level or at the operating system ("OS") kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network ("LAN") 1254 and/or larger networks, e.g., a wide area network ("WAN") 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point ("AP") disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor, operably coupled to the memory, and that executes the computer executable components stored in the memory, wherein the computer executable components comprise:
        a reset component that de-excites a qubit system to a target state by transitioning a population of a first excited state of the qubit system to a ground state and by applying a signal to the qubit system that transitions a population of a second excited state to the first excited state.

2. The system of claim 1, further comprising:
    a ground state component that transitions the population of the first excited state to the ground state by a reset selected from the group consisting of a measurement based reset, a sideband based reset, and a low-Q reset.

3. The system of claim 2, wherein the reset is the low-Q reset, and wherein the ground state component further renders a low-Q resonator of the qubit system to degenerate with the first excited state.

4. The system of claim 2, further comprising:
    a transition component that generates the signal that transitions the population of the second excited state to the first excited state, wherein the signal comprises at least one transition signal selected from the group consisting of a pi pulse transition signal and a microwave chirp transmission signal.

5. The system of claim 4, wherein the at least one transition signal removes a photon from a qubit at the second excited state to de-excite the qubit to the first excited state.

6. The system of claim 4, wherein the first excited state and the second excited state are comprised within a plurality of excited states, and wherein the at least one transition signal removes a photon from the plurality of excited states.

7. The system of claim 4, wherein the at least one transition signal is a series of the pi pulse transition signals, wherein the transition component generates a first pi pulse transition signal of the series that de-excites a population of a third excited state of the qubit system to the second excited state, and wherein the signal is a second pi pulse transition signal of the series.

8. A computer-implemented method, comprising:
    transitioning, by a system operatively coupled to a processor, a population of a first excited state of a qubit system to a ground state; and
    applying, by the system, a signal to the qubit system that transitions a population of a second excited state to the first excited state.

9. The computer-implemented method of claim 8, wherein the transitioning the population of the first excited state to the ground state is performed via a reset selected from the group consisting of a measurement based reset, a sideband based reset, and a low-Q reset.

10. The computer-implemented method of claim 9, wherein the reset is the low-Q reset, and wherein the computer-implemented method further comprises:
    rendering, by the system, a low-Q resonator of the qubit system to degenerate with the first excited state.

11. The computer-implemented method of claim 8, further comprising:
    generating, by the system, the signal that transitions the population of the second excited state to the first excited state, wherein the signal comprises at least one transition signal selected from the group consisting of a pi pulse transition signal and a microwave chirp transmission signal.

12. The computer-implemented method of claim 11, wherein the at least one transition signal removes a photon from a qubit at the second excited state to de-excite the qubit to the first excited state.

13. The computer-implemented method of claim 11, wherein the first excited state and the second excited state are comprised within a plurality of excited states, and wherein the at least one transition signal removes a photon from the plurality of excited states.

14. The computer-implemented method of claim 11, wherein the at least one transition signal is a series of the pi pulse transition signals, wherein the computer-implemented method further comprises generating, by the system, a first pi pulse transition signal of the series that de-excites a population of a third excited state of the qubit system to the second excited state, and wherein the signal is a second pi pulse transition signal of the series.

15. A computer program product for de-exciting a qubit system, the computer program product comprising a computer readable storage medium having program instructions embodied therewith, the program instructions executable by a processor to cause the processor to:
 transition, by the processor, a population of a first excited state of the qubit system to a ground state; and
 apply, by the processor, a signal to the qubit system that transitions a population of a second excited state to the first excited state.

16. The computer program product of claim 15, wherein the program instructions further cause the processor to transition the population of the first excited state to the ground state via a reset selected from the group consisting of a measurement based reset, a sideband based reset, and a low-Q reset.

17. The computer program product of claim 16, wherein the reset is the low-Q reset, and wherein the program instructions further cause the processor to:
 render, by the processor, a low-Q resonator of the qubit system to degenerate with the first excited state.

18. The computer program product of claim 15, wherein the program instructions further cause the processor to:
 generate, by the processor, the signal that transitions the population of the second excited state to the first excited state, wherein the signal comprises at least one transition signal selected from the group consisting of a pi pulse transition signal and a microwave chirp transmission signal.

19. The computer program product of claim 18, wherein the at least one transition signal removes a photon from a qubit at the second excited state to de-excite the qubit to the first excited state.

20. The computer program product of claim 18, wherein the first excited state and the second excited state are comprised within a plurality of excited states, and wherein the at least one transition signal removes a photon from the plurality of excited states.

* * * * *